(12) United States Patent
Bishop et al.

(10) Patent No.: US 10,711,821 B2
(45) Date of Patent: Jul. 14, 2020

(54) MODULAR LOCKING PIN

(71) Applicants: David Allen Bishop, Brookfield, NH (US); Michael Witzgall, Northfield, NH (US)

(72) Inventors: David Allen Bishop, Brookfield, NH (US); Michael Witzgall, Northfield, NH (US)

(73) Assignee: MITEE-BITE PRODUCTS LLC, Center Ossipee, NH (US)

( * ) Notice: Subject to any disclaimer, the term of this patent is extended or adjusted under 35 U.S.C. 154(b) by 324 days.

(21) Appl. No.: 15/690,462

(22) Filed: Aug. 30, 2017

(65) Prior Publication Data

US 2018/0058490 A1  Mar. 1, 2018

Related U.S. Application Data

(60) Provisional application No. 62/381,673, filed on Aug. 31, 2016.

(51) Int. Cl.
| | | |
|---|---|---|
| F16B 21/00 | (2006.01) | |
| F16B 35/00 | (2006.01) | |
| F16B 21/12 | (2006.01) | |
| F16B 21/16 | (2006.01) | |
| F16B 2/16 | (2006.01) | |
| F16B 21/14 | (2006.01) | |

(52) U.S. Cl.
CPC ............. *F16B 35/005* (2013.01); *F16B 2/16* (2013.01); *F16B 21/125* (2013.01); *F16B 21/165* (2013.01); *F16B 2021/14* (2013.01)

(58) Field of Classification Search
CPC ...... F16B 21/12; F16B 21/125; F16B 21/165; F16B 2021/14
USPC .......................................... 411/348
See application file for complete search history.

(56) References Cited

U.S. PATENT DOCUMENTS

| | | | | |
|---|---|---|---|---|
| 2,232,340 | A * | 2/1941 | Olson ..................... | B24B 15/00 451/430 |
| 3,477,333 | A * | 11/1969 | Yamamoto ............ | F16B 21/165 411/348 |
| 3,498,653 | A * | 3/1970 | Mccreery ................ | B23B 29/20 403/322.2 |
| 3,608,937 | A * | 9/1971 | Nave ......................... | F16B 2/16 403/57 |
| 3,902,379 | A * | 9/1975 | Bennett ................... | B64C 13/12 74/480 R |
| 4,135,418 | A * | 1/1979 | McCray .................. | B23B 29/20 279/75 |
| 6,554,524 | B1 * | 4/2003 | Smith ...................... | H02G 7/04 403/78 |
| 7,052,223 | B1 * | 5/2006 | Miller ...................... | B60R 7/02 24/453 |
| 7,377,137 | B1 * | 5/2008 | Bednarz ................ | E05B 63/121 403/322.2 |

* cited by examiner

*Primary Examiner* — Gary W Estremsky
(74) *Attorney, Agent, or Firm* — Dunlap Bennett & Ludwig PLLC; Brendan E. Squire

(57) ABSTRACT

An industrial or residential modular locking pin which captures and retains items with optional adjustable pressure prior to tightening. An elongate body carries a plurality of locking balls that are selectively urged radially outwardly to extend past an outer surface of the pin to retain a mounting aperture of a workpiece. Manual and automatically actuated configurations are disclosed.

20 Claims, 4 Drawing Sheets

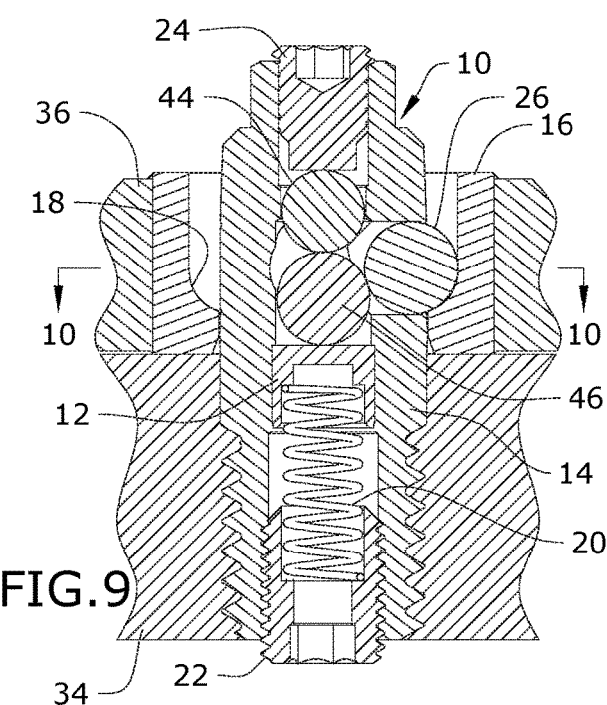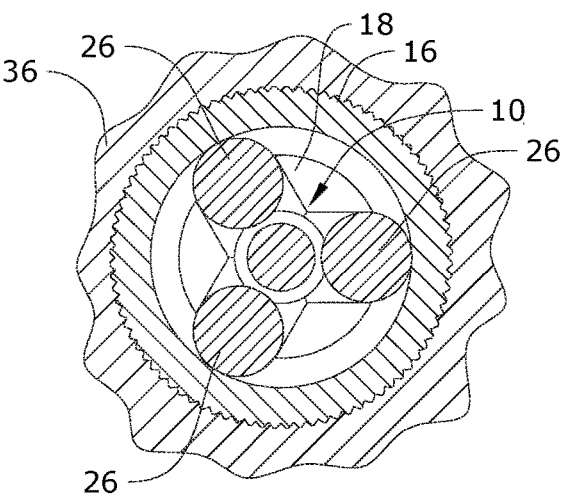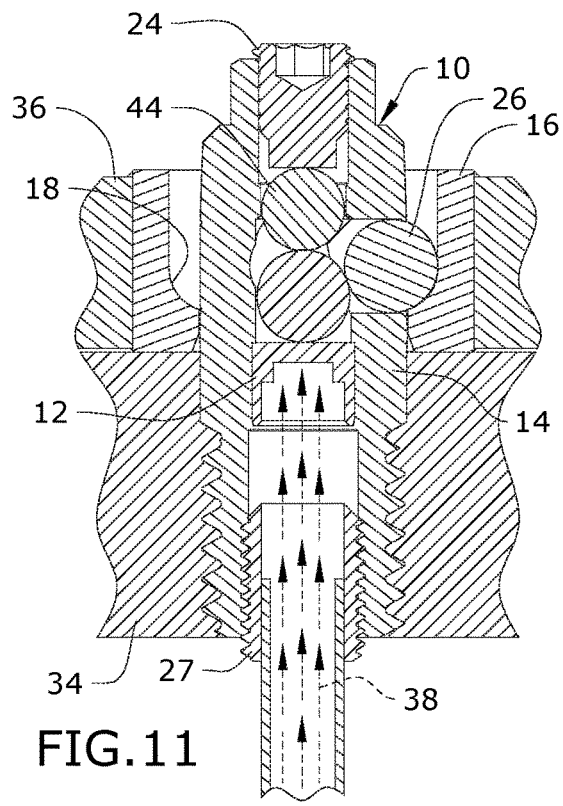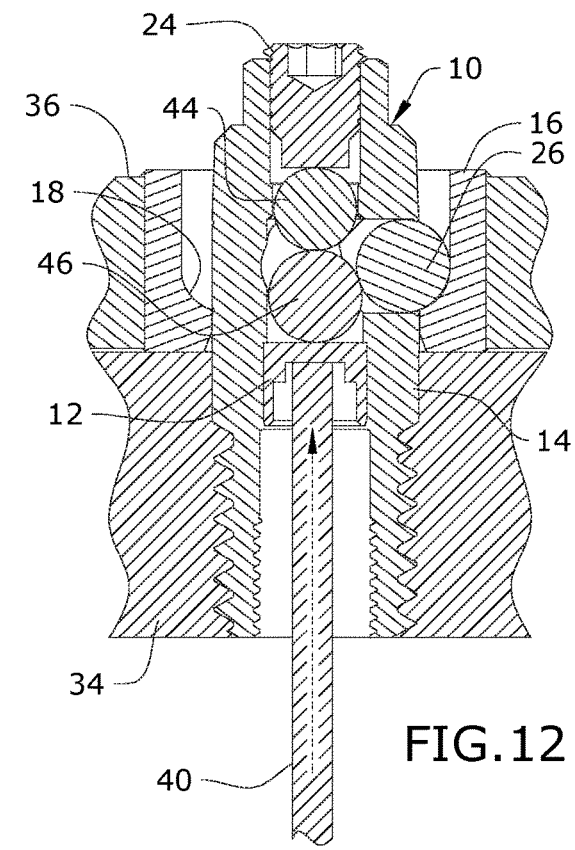

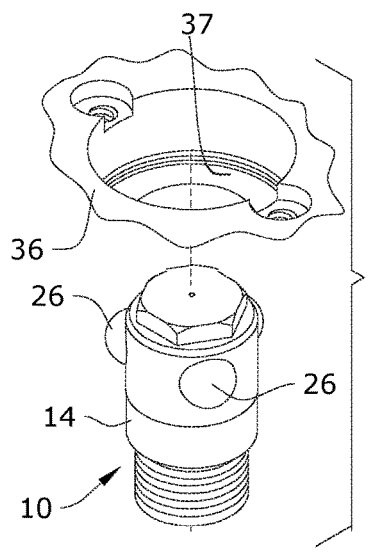
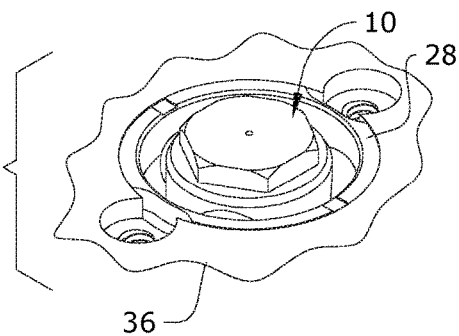
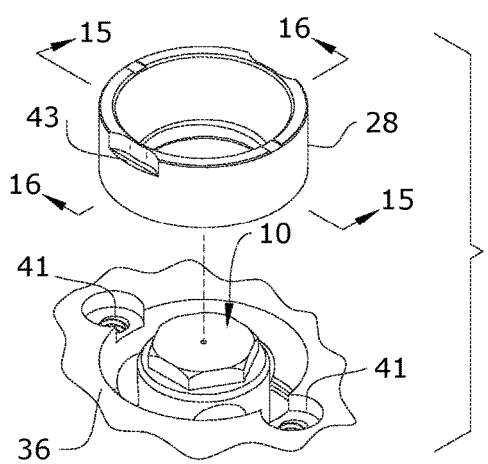
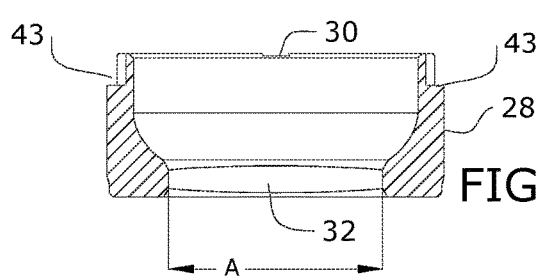
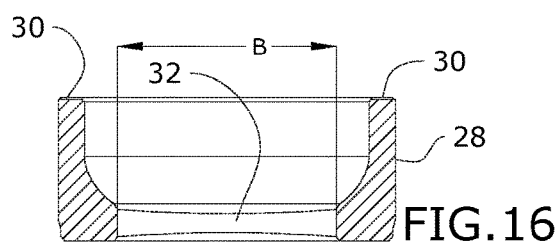
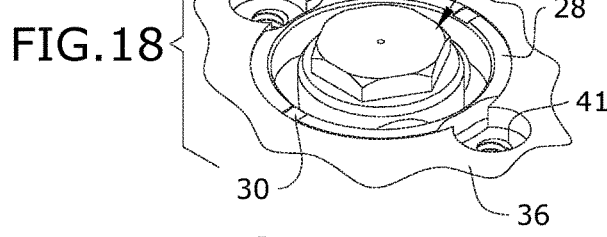
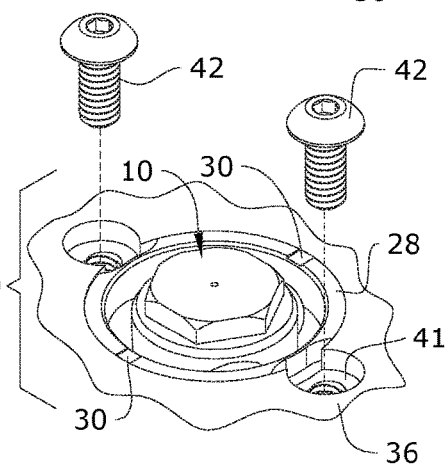
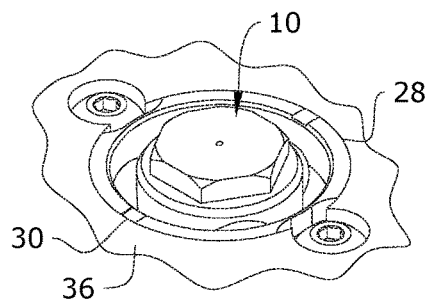

MODULAR LOCKING PIN

CROSS-REFERENCE TO RELATED APPLICATION

This application claims the benefit of U.S. Provisional Patent Application No. 62/381,673, filed Aug. 31, 2016, the contents of which are herein incorporated by reference.

BACKGROUND OF THE INVENTION

The present invention relates to fasteners, and more particularly to locking pins to mechanically attach two articles.

Present systems for securing items to a vise rely on bolts or pins. The pins may be configured on a vise table to position a work piece, however they have an inability to hold something and secure at the same time. To correct for this deficiency, bolts or other fasteners need to be tightened in order to secure objects for assembly or machining a work piece.

With other fastening means, the operator must hold objects in place while tightening. Similarly, an operator would have to remove and replace a product if going from manual to automated.

As can be seen, there is a need for an improved fastener that can also permanently hold items without the need of any tools to secure the item held.

SUMMARY OF THE INVENTION

In one aspect of the present invention, a locking pin, has an elongate body with an interior channel extending through the elongate body. A plurality of bores radially extend from the interior channel through an outer surface of the elongate body. A locking ball is captively received in each of the plurality of radial bores. A least one drive ball is carried within the interior channel and is configured to be selectively urged against the locking ball so that the locking ball may protrude from the outer surface of the elongate body.

In some embodiments, the drive ball is disposed above the plurality of bores. In other embodiments, the drive ball is disposed below the plurality of bores. In yet other embodiments, a first drive ball is disposed above the plurality of bores; and a second drive ball disposed below the plurality of bores.

In other aspects, a support cup is carried within the interior channel and is operable to urge against the at least one drive ball. A spring may carried within the interior channel and a set screw is threadingly received within the interior channel and is configured to adjustably bias the spring against the support cup.

In some embodiments, a hydraulic fitting in communication with the interior channel is configured to receive a source of hydraulic pressure for selectively applying an actuating force to the support cup. In other embodiments, an actuator rod is received within the interior channel and is configured to selectively apply an actuating force to the support cup.

In other aspects of the invention, the locking pin also includes a bushing having an ellipsoidal interior opening; and an annular rim defined within the interior opening to cooperatively engage with the locking ball to urge the bushing in a Z-axis of the locking pin. The ellipsoidal interior opening may further include a first ellipsoidal diameter and a second ellipsoidal diameter that is smaller than the first ellipsoidal diameter. The locking ball cooperatively engages the interior opening to urge the bushing in a lateral direction corresponding to the orientation of the second ellipsoidal diameter. The locking pin may also include a plurality of threads defined in a lower portion of the elongate body.

In yet other aspects of the invention, a fixture for securing a workpiece, includes a locking pin having an elongate body, an interior channel extending through the elongate body, a plurality of bores radially extending from the interior channel through an outer surface of the elongate body, a locking ball captively received in each of the plurality of bores; and at least one drive ball carried within the interior channel configured to be selectively urged against the locking ball so that the locking ball protrudes from the outer surface of the elongate body. The fixture may also include a bushing having an ellipsoidal interior opening and an annular rim defined within the interior opening to cooperatively engage with the locking ball to urge the bushing in a Z-axis of the locking pin.

A mounting aperture may be defined within the workpiece, and is dimensioned to receive the locking pin with the locking balls in a loosened state and hold the workpiece with the locking ball in holding state. A shoulder may be defined within the mounting aperture, the shoulder dimensioned to support a bottom surface of the busing. A retaining point may also be defined at a top end of the mounting aperture and a retaining screw is threadingly received in the mounting aperture, wherein a head of the retaining screw secures a top rim of the bushing. A recess may be defined in the top rim of the bushing configured to receive the head.

These and other features, aspects and advantages of the present invention will become better understood with reference to the following drawings, description and claims.

BRIEF DESCRIPTION OF THE DRAWINGS

FIG. 9 is a side section view of the modular locking pin taken long line 9-9 in FIG. 8;

FIG. 10 is a section view of the modular locking taken along line 10-10 in FIG. 9;

FIG. 11 is a section view of a hydraulically actuated embodiment of the modular locking pin;

FIG. 12 is a section view of a mechanically actuated embodiment of the modular locking pin;

FIG. 13 is an exploded view of an alternate embodiment of the invention;

FIG. 14 is an exploded view of an alternate embodiment of the invention;

FIG. 15 is a section view of an alternate embodiment of the invention component taken along line 15-15 in FIG. 14;

FIG. 16 is a section view of an alternate embodiment of the invention component taken along line 16-16 in FIG. 14;

FIG. 17 is perspective detail view of an alternate embodiment of the invention shown in use;

FIG. 18 is perspective detail view of an alternate embodiment of the invention shown in use;

FIG. 19 is an exploded perspective detail view of an alternate embodiment of the invention shown in use; and FIG. 20 is perspective detail view of an alternate embodiment of the invention shown in use.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide a system, method, and apparatus for a modular locking pin for securement of items. While discussed herein with respect to securing a work piece to a machining vise, the modular locking pin may be utilized in a broad number of applications requiring a fastener.

Figure 1:
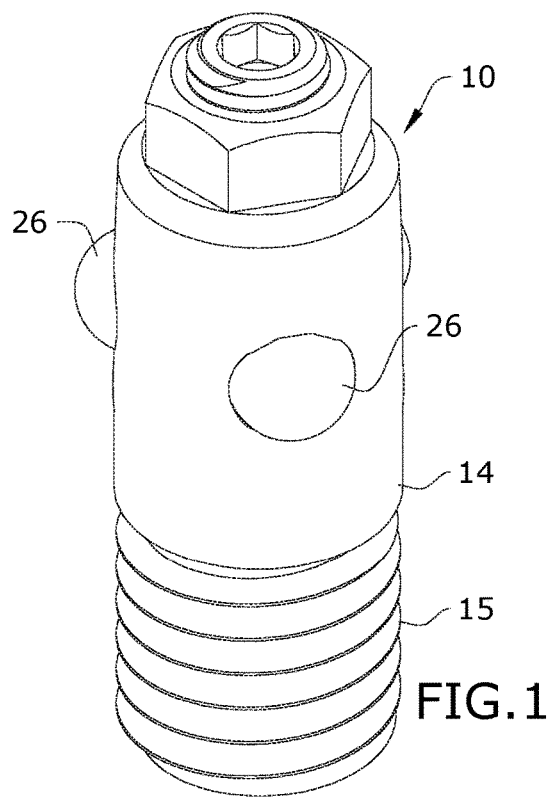
FIG. 1 is a perspective view of a modular locking pin.
Figure 2:
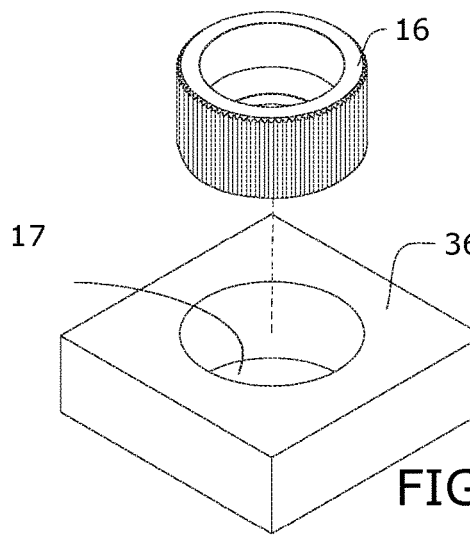
FIG. 2 is an exploded view of a retaining bushing component shown in use.
Figure 4:
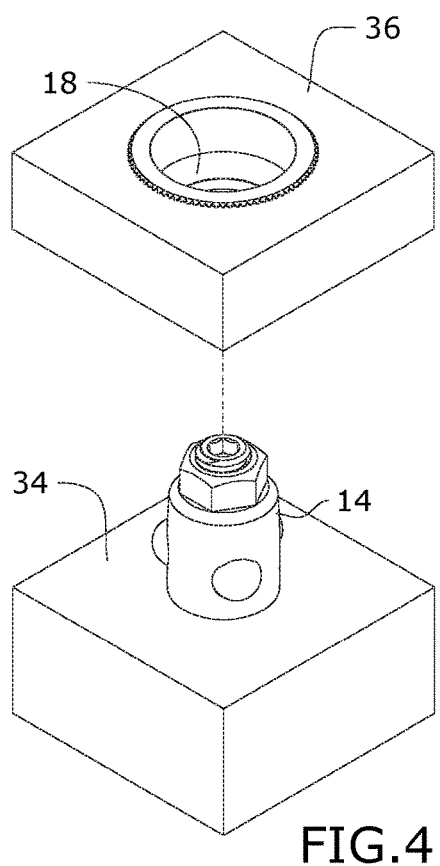
FIG. 4 is an exploded view of the modular locking pin and bushing shown in use.

As seen in reference to FIG. 1, a locking pin 10 includes an elongate housing 14. The elongate housing 14 is formed with a precision diameter to its outer surface to fit within a mounting aperture 17, shown in FIGS. 2 and 4, for a workpiece 36 or other article to be retained by the locking pin 10. Preferably the elongate housing 14 is cylindrical in shape. A top end of the elongate housing 14 may have a chamfered edge around the periphery thereof to facilitate the insertion of the locking pin 10 into the mounting aperture 17. A plurality of locking balls 26 are operable to extend radially outwardly from the elongate housing 14 and engage with an interior sidewall of the mounting aperture 17. The mounting aperture 17, may also be fitted with a bushing 16 to add additional holding features for the workpiece 36.

Figure 3:
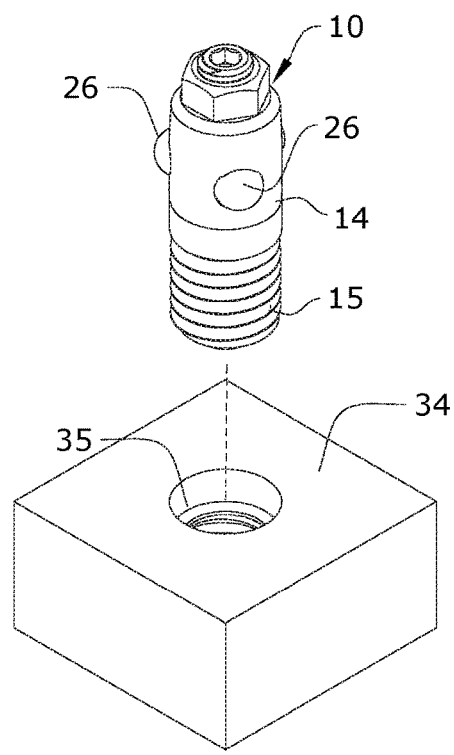
FIG. 3 is an exploded view of the modular locking pin shown in use.

In some embodiments, a plurality of threads 15 are applied to the outer surface of the housing 14 along a lower portion thereof. As seen in reference to FIG. 3, the threads 15 are configured for attachment of the locking pin 10 to a work table 34, such as a milling machine. The threads 15 secure the locking pin 10 in at least one of a plurality of threaded apertures 35 defined in a top surface of the work table 34. The locking pin 10 may be tightened within the threaded apertures 35 via a shaped fastening head, such as a hexagonal head. In other embodiments, a rotary broach hex opening may be formed in the top end of the locking pin 10 to facilitate engaging and disengaging the threads 15. The hex opening may be tightened with a tool, such as an Allen wrench.

Figure 5:
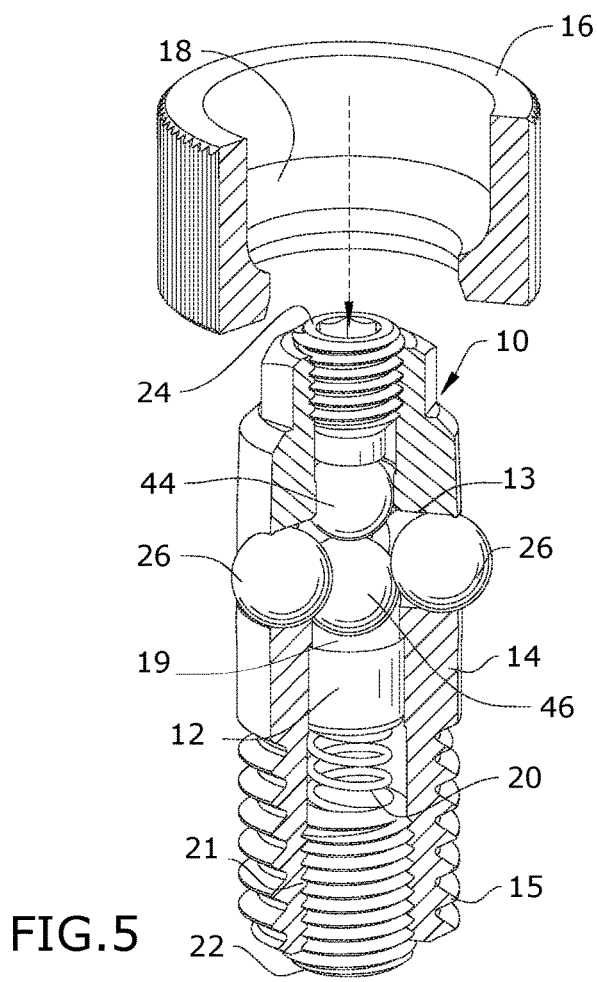
FIG. 5 is an exploded cutaway view of the modular locking pin and retaining bushing shown pre-bushing placement.
Figure 6:
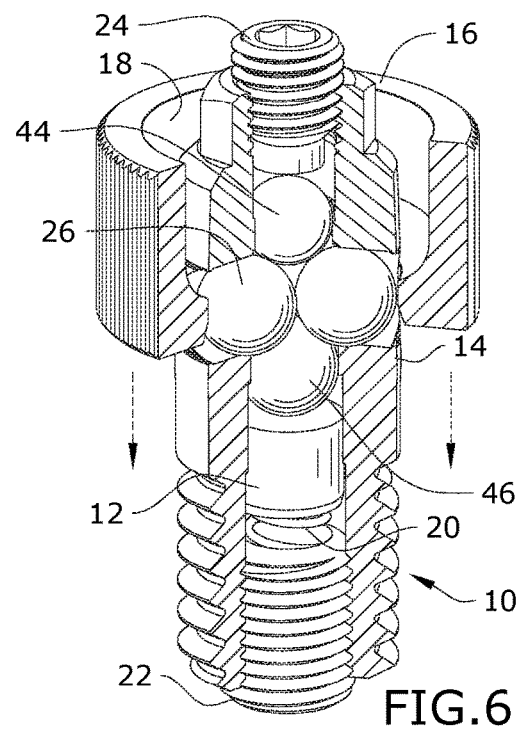
FIG. 6 is an exploded cutaway view of the modular locking pin shown at an intermediate position of bushing placement.
Figure 8:
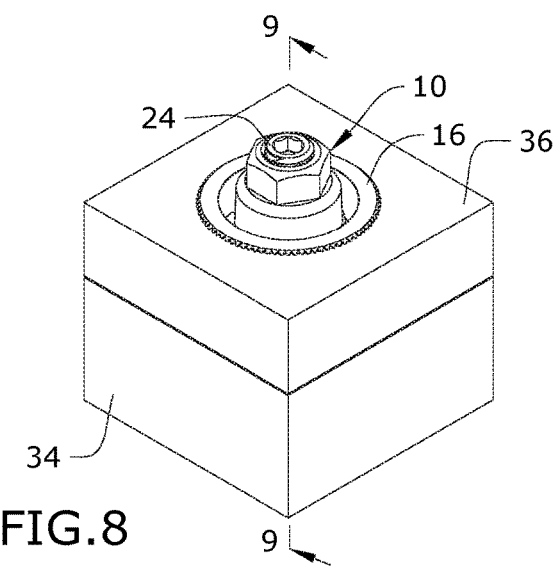
FIG. 8 is a perspective view of the modular locking pin and bushing shown in use retaining a workpiece.
Figure 7:
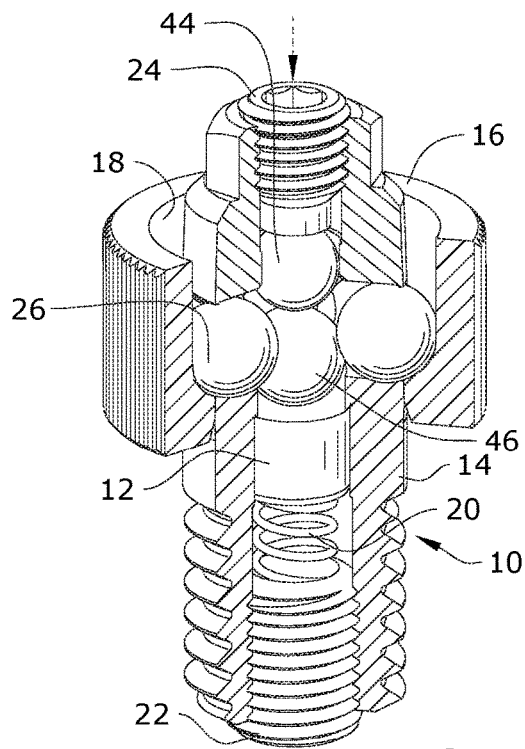
FIG. 7 is a cutaway view of the modular locking pin shown securing the bushing.

As seen in reference to FIGS. 5-7, the elongate housing 14 includes a plurality of bores 13 extend radially from an internal channel 19 extending through a longitudinal length of the elongate housing. The bores 13 extend between the internal channel 19 through an outer surface of the elongate housing 14 at an intermediate portion thereof. The bores 13 may have converging sidewalls with a larger diameter proximal to the channel 19 sufficient to carry the locking ball 26. A plurality of locking balls 26 are received through the channel 19, and one ball 26 is received within each of the plurality of bores 13. The locking balls 26 have a diameter to be received within the bores 13 proximal to the channel and smaller than that of the bores 13 proximal to the outer surface of the elongate body 14, such that the locking balls 26 are captively retained in the elongate housing 14 a portion of the locking balls 26 may selectively protrude from the outer surface of the housing 14.

Actuation of the locking balls 26 may be accomplished by manually or automatically. A first drive ball 44 may be positioned in the channel above the plurality of locking balls 26 and a second drive ball 46 is positioned in the channel below the plurality of locking balls 26. In some embodiments, such as shown in reference to FIGS. 1 and 3-12, the top end of the channel is configured with a plurality of threads to receive a manual drive set screw 24. The set screw 24 is adjustable to urge the first drive ball 44 against the locking balls 26 and thereby drive the locking balls 26 outwardly in the bores 13.

In other embodiments, a support cup 12 may be received in the channel beneath the lower second ball 46. The support cup 12 may be mechanically or hydraulically actuated to urge the support cup 12 against the second drive ball 46 and thereby drive the locking balls 26 outwardly within the bores 13. In the embodiments shown in reference to FIGS. 5-7 and 9, a tension spring 20 may be positioned within the channel to apply an adjustable biasing force between a pressure adjustment set screw 22 and the support cup 12. In these embodiments, the bottom end of the channel is provided with a plurality of internal threads 21 to engage with the pressure adjustment set-screw 22. Alternatively, with the tension spring 20 above drive ball 42 the retaining force may be manually adjusted by snapping on/off and adjusting the set screw 24 with the workpiece 36 removed or installed from the pin 10 until desired holding force is obtained.

In some embodiments, such as shown in reference to FIG. 11, the bottom end of the channel may be operatively connected to a source of pressurized hydraulic fluid 38 via a coupling 27, received in the internal threads 21. The pressurized hydraulic fluid 38 may be selectively applied to the coupling 27 for automatic actuation of the support cup 12 against the second drive ball 46 for moving locking pin 10 between a locked and an unlocked position.

In operation, application of a compressive force to urge at least one of the first drive ball 44 and the second drive ball 46 towards one another applies a force to the surfaces of the locking balls 26 carried in the channel and drives the locking balls 26 outwardly. As the locking balls 26 are urged outwardly a surface of the balls 26 extend external to the radial bores 13 such that they are in a position to retain the workpiece 36 on the precise diameter portion of the locking pin 10.

In manual embodiments of the locking pin, the manual drive set screw 24 is rotated, such as by an Allen wrench, which urges the first drive ball 44 towards the lower drive ball 46 and applies a compressive force to urge the locking balls 26 outwardly. In an automated embodiment of the invention, such as shown in FIG. 11, a source of pressurized hydraulic fluid 38 urges support cup 12, and thereby lower drive ball 46 upwardly to urge locking balls 26 outwardly. In other embodiments a mechanical or electro mechanical actuator, such as a solenoid may be configured with an actuator rod 40 to selectively drive the support cup 12 between a locked and an unlocked position.

The pin housing 14 may be CNC machined to tight tolerances for each specific component all which are 100% contained inside of pin body 14. When assembled the locking balls 26 may be fully extended with light pressure and is readily applied to a work surface 34 by screwing pin into fixture with via a tool applied to the rotary broach hex until tight. A work piece object 36 may be snap fit onto the locking pin 10. The locking pin 10 may produce an audible click as the locking balls 26 apply a pre-determined pressure onto prepared mounting feature 17 in an object or onto a workpiece housing 36. If additional holding force is necessary, the set screw 24 or the pressure adjustment set screw 22 may be tightened forcing the first drive ball 44 towards the second drive ball 46 until a desired holding force is obtained. To release the object loosening one of set screws 24, 22 will still force 4 out preventing object from disconnecting with the locking pin until sufficient tension is relieved The object may then be removed by pulling straight up in the Z+ axis.

In other aspects of the invention, the locking pin 10 may also be utilized with a retaining collar, or bushing 16 the operation of which is shown in reference to FIGS. 2-4 and 13-20. The bushing 16 may be configured to apply a locking force in a vertical, or Z-axis of the fixture. In other embodiments, the bushing 16 may be configured for applying a locking force in a lateral, X or Y axis of the fixture. In additional to these directional locking capabilities the bushing 16 may be utilized to protect the secured item 36 from being damaged by actuation of the locking balls 26 when the secured item is formed of a softer material than that of the locking balls 26.

The bushing 16 may be received in the mounting aperture 17 of the work piece 36. The mounting aperture 17 may include a retaining point 41 defined at the sides of the mounting aperture 17. The retaining points 41 may threadingly receive a retaining screw 42 so that the head of the retaining screw engages with an upper rim of the bushing 16. Preferably, the upper rim includes a recess 43 that is configured to receive the head of the retaining screw 42 so that the bushing may be retained below a working surface of the workpiece 36.

Depending upon the configuration, the bushing 16 may be formed as a circular or an ellipsoidal ring having an annular rim 18 defined around an interior surface of the bushing 16. In either case, the bushing 16 is configured to apply a holding force in the Z-axis. The bushing 16 may be placed around the upper portion of the locking pin 10, such that a lower face of the bushing 16 is positioned in abutment with an upward facing surface 37 of the work piece 36. The annular rim 18 has a radius of curvature that corresponds to that of the locking balls 26. When the locking pin 10 is actuated, the locking balls 26 protrude outwardly through the radial bores 13. The locking balls 26 will encounter the annular rim 18 and apply a downward force on the annular rim 18, thereby urging against the bushing 18 against the workpiece 36 in a Z-axis.

In the case of an ellipsoidal bushing 28, shown in reference to FIG. 15, the bushing is configured to apply a lateral holding force in a lateral direction that is radially selectable. The bushing has a first interior diameter A that is larger than that of a second interior diameter B of the ellipsoid. An index notch 30 may be defined in a top surface of the bushing 16 so that it is oriented with the second diameter B to provide a directional index reference for the directional application of the lateral force. In this case, upon activation of the locking pin 10, the protrusion of the locking balls 26 will encounter the second, shorter diameter interior sidewalls of the ellipsoidal bushing 28, thereby applying a force to the bushing 28 and the workpiece 36 in the selected lateral direction.

As will be appreciated, the locking pin 10 may simply be threaded into an object that a person would like to attach to another object to quickly and without any tools if preset pressure is suitable for application. The object being attached to the locking pin 10 would require a mounting feature that has a bore equal to the diameter of the locking pin precision diameter portion and a counter sink angle, allowing the locking balls 74 to project out of pin applying downward pressure to object being placed onto pin.

While primarily designed for the tool and fabrication industry to hold plates, components, or raw material to be machined into something functional, the locking pin 10 could be used in virtually unlimited applications. For example to hold a mop in a closet. The mop handle would require a hole with counter sink angle to snap on/snap off the locking pin 10. Smaller versions of the locking pin 10 could be used to assemble a doll house without any tools. Almost anything could snap on/off with adjustable or preset pressure. In another example application of the locking pin 10, NASCAR could hold control boxes and change automotive components in seconds during a pit stop. A space station could use to hold tools or even seal a docking station. Uses are limitless, anything retained with a bolt could be retained with this locking pin.

The locking retaining pin could be manufactured with the strongest materials available and any diameter for miniature to massive applications. In household applications, it could be formed of plastics or other suitable materials. Also, it will produce simplicity for every father or mother trying to assemble a present for their child. The locking pin 10 can also be utilized as secure attachment point on emergency vehicles where an object or tool needs to be removed quickly just by grabbing and pulling with the added security knowing item will remain in place in transit.

As will be appreciated, the locking pin 10 does not need to be removed during use. Accordingly, unlike a bolt that can be lost, or fall into critical machinery, the locking pin 10 may be utilized to hold components together, without risk of being lost. It will also be appreciated that the locking pin 10 can be activated from either or both ends. Likewise, additional bores 13, locking balls 26 and drive balls 42, 46 may be disposed at other lengths along the elongate housing 14 thereby providing additional points at which one or more objects may be joined.

It should be understood, of course, that the foregoing relates to exemplary embodiments of the invention and that modifications may be made without departing from the spirit and scope of the invention as set forth in the following claims.

What is claimed is:
1. A locking pin, comprising:
   an elongate body having an interior channel extending through the elongate body;
   a plurality of bores radially extending from the interior channel through an outer surface of the elongate body;
   a locking ball captively received in each of the plurality of radial bores; and
   a first drive ball and a second drive ball carried within the interior channel, the first drive ball disposed above the plurality of bores and the second drive ball disposed below the plurality of bores, the first drive ball and the second drive ball configured to be selectively urged against the locking ball so that the locking ball may protrude from the outer surface of the elongate body.
2. The locking pin of claim 1, further comprising:
   a support cup carried within the interior channel and operable to urge against the at least one drive ball.
3. The locking pin of claim 1, further comprising:
   a spring carried within the interior channel; and a set screw threadingly received within the interior channel and configured to adjustably bias the spring against the support cup.

4. The locking pin of claim 2, further comprising:
a hydraulic fitting in communication with the interior channel and configured to receive a source of hydraulic pressure for selectively apply an actuating force to the support cup.

5. The locking pin of claim 2, further comprising:
an actuator rod received within the interior channel configured to selectively apply an actuating force to the support cup.

6. The locking pin of claim 1, further comprising:
a bushing having an ellipsoidal interior opening; and
an annular rim defined within the interior opening to cooperatively engage with the locking ball to urge the bushing in a Z-axis of the locking pin.

7. The locking pin of claim 6, the ellipsoidal interior opening further comprising:
a first ellipsoidal diameter and a second ellipsoidal diameter smaller than the first ellipsoidal diameter, wherein the locking ball cooperatively engages the interior opening to urge the bushing in a lateral direction corresponding to the orientation of the second ellipsoidal diameter.

8. The locking pin of claim 1, further comprising:
a plurality of threads defined in a lower portion of the elongate body.

9. A fixture for securing a workpiece, comprising:
a locking pin, having an elongate body, an interior channel extending through the elongate body, a plurality of bores radially extending from the interior channel through an outer surface of the elongate body, a locking ball captively received in each of the plurality of bores; and a first and a second drive ball carried within the interior channel configured to be selectively urged against the locking ball so that the locking ball protrudes from the outer surface of the elongate body, wherein the first drive ball is disposed above the locking ball and the second drive ball is disposed below the locking ball.

10. The fixture of claim 9, further comprising:
a bushing having an ellipsoidal interior opening; and
an annular rim defined within the interior opening to cooperatively engage with the locking ball to urge the bushing in a Z-axis of the locking pin.

11. The fixture of claim 10, further comprising:
a mounting aperture defined within the workpiece, the mounting aperture dimensioned to receive the locking pin with the locking balls in a loosened state and hold the workpiece with the locking ball in holding state.

12. The fixture of claim 11, further comprising:
a shoulder defined within the mounting aperture, the shoulder dimensioned to support a bottom surface of the bushing.

13. The fixture of claim 12, further comprising:
a retaining point defined at a top end of the mounting aperture; and a retaining screw threadingly received in the mounting aperture, wherein a head of the retaining screw secures a top rim of the bushing.

14. The fixture of claim 13, further comprising:
a recess defined in the top rim of the bushing configured to receive the head.

15. A locking pin, comprising:
an elongate body having an interior channel extending through the elongate body;
a plurality of bores radially extending from the interior channel through an outer surface of the elongate body;
a locking ball captively received in each of the plurality of radial bores; and
a first drive ball and a second drive ball carried within the interior channel, the first drive ball disposed above the plurality of radial bores; and
the second drive ball disposed below the plurality of radial bores configured to be selectively urged against the locking ball so that the locking ball may protrude from the outer surface of the elongate body;
a support cup carried within the interior channel and operable to urge against the at least one drive ball; and
a hydraulic fitting in communication with the interior channel and configured to receive a source of hydraulic pressure to selectively apply an actuating force to the support cup.

16. The locking pin of claim 15, further comprising:
a plurality of threads defined in a lower portion of the elongate body.

17. The locking pin of claim 15, wherein the at least one drive ball is disposed above the plurality of radial bores.

18. The locking pin of claim 15, wherein the at least one drive ball is disposed below the plurality of radial bores.

19. A locking pin comprising:
an elongate body having an interior channel extending through the elongate body;
a plurality of bores radially extending from the interior channel through an outer surface of the elongate body;
a locking ball captively received in each of the plurality of radial bores; and
at least one drive ball carried within the interior channel, configured to be selectively urged against the locking ball so that the locking ball may protrude from the outer surface of the elongate body;
a support cup carried within the interior channel and operable to urge against the at least one drive ball;
a spring carried within the interior channel;
a set screw threadingly received within the interior channel and configured to adjustably bias the spring against the support cup; and
a hydraulic fitting in communication with the interior channel and configured to receive a source of hydraulic pressure to selectively apply an actuating force to the support cup.

20. The locking pin of claim 19, further comprising:
a first drive ball disposed above the plurality of bores; and
a second drive ball disposed below the plurality of bores.

* * * * *